United States Patent [19]

Ellison et al.

[11] Patent Number: 5,048,791
[45] Date of Patent: Sep. 17, 1991

[54] SHUT OFF VALVE

[75] Inventors: John E. Ellison, Ridgeland; Mai Ujjin, Madison, both of Miss.

[73] Assignee: Parker Hannifin Corporation, Cleveland, Ohio

[21] Appl. No.: 620,948

[22] Filed: Nov. 29, 1990

[51] Int. Cl.⁵ .................. F16K 31/126; F16K 31/68
[52] U.S. Cl. ................................ 251/73; 137/463
[58] Field of Search .................. 137/456, 461, 463; 239/570; 251/63.5, 63.6, 73

[56] References Cited

U.S. PATENT DOCUMENTS

| 723,402 | 3/1903 | Moore et al. | 137/463 |
| 1,160,118 | 11/1915 | Absalom et al. | 137/463 |
| 1,196,318 | 8/1916 | Waddell, Jr. | 137/463 |
| 2,070,661 | 2/1937 | Hughes | 137/463 |
| 2,293,325 | 8/1942 | Wood | 251/73 |
| 3,381,933 | 5/1968 | Derhammer | 251/73 |
| 3,429,321 | 2/1969 | Thrall | 137/463 |
| 3,602,249 | 8/1971 | Zingg | 137/463 |
| 3,818,932 | 6/1974 | Doe et al. | 137/463 |
| 4,033,374 | 7/1977 | Danon | 251/73 |

FOREIGN PATENT DOCUMENTS 2206674 1/1989 United Kingdom .................. 251/73

Primary Examiner—George L. Walton
Attorney, Agent, or Firm—Ralph E. Jocke

[57] ABSTRACT

A resetable shut off valve includes a body (10) having an inlet (12) and an outlet (14). The inlet and outlet are connected in the valve body through a fluid passage which includes an opening (26). A movable plunger assembly (42) includes a seal disc (56) sized for blocking the opening. The plunger assembly is biased towards a position blocking the opening by a compression spring (57). A u-shaped wire spring (66) includes a foot portion (70) which engages a recess (46) in the plunger assembly to hold the assembly disposed from the opening. The foot portion of the wire spring abuts a first surface (36) in the body. The wire spring is attached at the end opposed of the foot portion to a movable pressure plate (58) which abuts a diaphragm (80). When fluid pressure is introduced to a second chamber of the valve (78) above the diaphragm, the wire spring is pushed against the first surface, deforms and disengages the recess in the plunger assembly. The plunger assembly moves downward until the seal disc blocks the opening closing the valve. The valve is reset to the open condition by manually moving a pushrod (88), which moves the plunger assembly upward until it again engages the wire spring.

19 Claims, 3 Drawing Sheets

SHUT OFF VALVE

TECHNICAL FIELD

This invention relates to shut off valves. Particularly this invention relates to a valve that shuts off the flow of combustible or otherwise dangerous fluid when an emergency condition arises.

BACKGROUND ART

In carrying out industrial processes that involve hazardous or combustible substances, there is always a risk that a malfunction may result in damage or injury. To minimize the damage caused by such a malfunction, it is desirable to shut off the flow of hazardous substances as soon as the emergency is detected. This is particularly true in industrial operations that employ combustible fuels such as natural gas for heating in a furnace or oven. In the event of a malfunction which causes a fire in the area of the furnace or oven, it is desirable to shut off the flow of combustible gas as soon as the fire condition is sensed.

Industrial furnaces and ovens are often equipped with automatic fire detection and extinguishing systems. Such systems are designed to sense a fire or an overheated condition and to spray $CO_2$, dry chemical, foam or another type of fire extinguishing agent on the fire. When the fire extinguishing system is triggered, it is almost always desirable to shut off the flow of fuel to the furnace or oven. Of course, when the emergency condition is corrected, it is necessary to reinstitute the flow of gas so that the process may be restarted.

Various types of systems have been devised which use conventional valves to shut off the flow of combustible material to a furnace or oven when a fire occurs. Such systems involve components such as sensors, relays, solenoids, transformers and other items which may malfunction. A malfunction could result in the fuel continuing to be delivered even after the fire extinguishing system is tripped. This may defeat the fire extinguishing system.

Thus, there exists a need for a device which will shut off the flow of combustible fuel to an industrial furnace or oven or other type of heating device when a fire extinguishing system is tripped. There further exists a need for a device that is less costly and has greater reliability than prior devices and systems.

DISCLOSURE OF INVENTION

It is an object of the present invention to provide a shut off valve for the flow of fluids that is reliable and inexpensive.

It is a further object of the present invention to provide a shut off valve that is closed in response to triggering of a fire extinguishing system.

It is a further object of the present invention to provide a shut off valve that includes an actuator responsive to the flow of fire extinguishing material in a fire extinguishing system.

It is a further object of the present invention to provide a shut off valve that may be readily reset manually to reinstitute flow therethrough.

It is a further object of the present invention to provide a simple low cost actuator for a valve that may be readily reset.

Further objects of the present invention will be made apparent in the following Best Mode for Carrying Out Invention and the appended claims.

The foregoing objects are accomplished in the preferred embodiment of the present invention by a valve having a body with a fuel inlet and a fuel outlet. A fluid passage extends through the body of the valve. The fluid passage includes a circular opening which is bounded by a seat.

A generally cylindrical plunger is mounted for movement in the body of the valve. The plunger is movable between first and second positions. The plunger has a disc shaped seal mounted thereon which is sized for mating with the seat and blocking the flow through the opening when the plunger is in the second position. A compression spring mounted inside the body biases the plunger towards its second position.

The body also has a first chamber disposed from the circular opening. In the first position of the plunger a cylindrical portion thereof extends into the first chamber. The cylindrical portion of the plunger includes a circumferential recess. The first chamber includes a first surface that extends adjacent to the cylindrical portion of the plunger.

A pressure plate is mounted for movement in the first chamber. A generally u-shaped wire spring which serves as a latching member, extends into two spaced holes in the pressure plate. The wire spring has a pair of legs that when the valve as assembled depend from the pressure plate at an acute angle to the first surface. A foot portion of the wire spring extends between the leg portions. The foot portion also abuts the first surface and engages the recess in the plunger when the plunger is in the first position.

The valve body also includes a second chamber which is adjacent the first chamber and is separated therefrom by a fluid tight diaphragm. The second chamber includes a control port for enabling a control fluid to enter the second chamber. The pressure plate in the first chamber abuts and supports the flexible diaphragm.

The control port is normally connected through a conduit to a line that delivers fire extinguishing material to a nozzle. When the fire extinguishing system is tripped, the increased pressure associated with the extinguishing material flowing through the lines is introduced into the second chamber. As the result of the increased pressure, the diaphragm and pressure plate move toward the first chamber. This bends the wire spring s that its foot portion disengages the plunger. The plunger then moves under the force applied by the compression spring to the second position in which it closes the opening in the fluid flow path through the valve.

The valve also includes a pushrod that is mounted for movement in the body. The pushrod extends through the valve opposite the plunger. The pushrod includes an exterior end that extends outside of the body when the plunger is in the second position. With the plunger in the second position, the pushrod is moved inward to reset the plunger to the first position. The cylindrical portion reengages the wire spring in the first chamber to reset the valve.

BEST MODE FOR CARRYING OUT INVENTION

Figure 1:
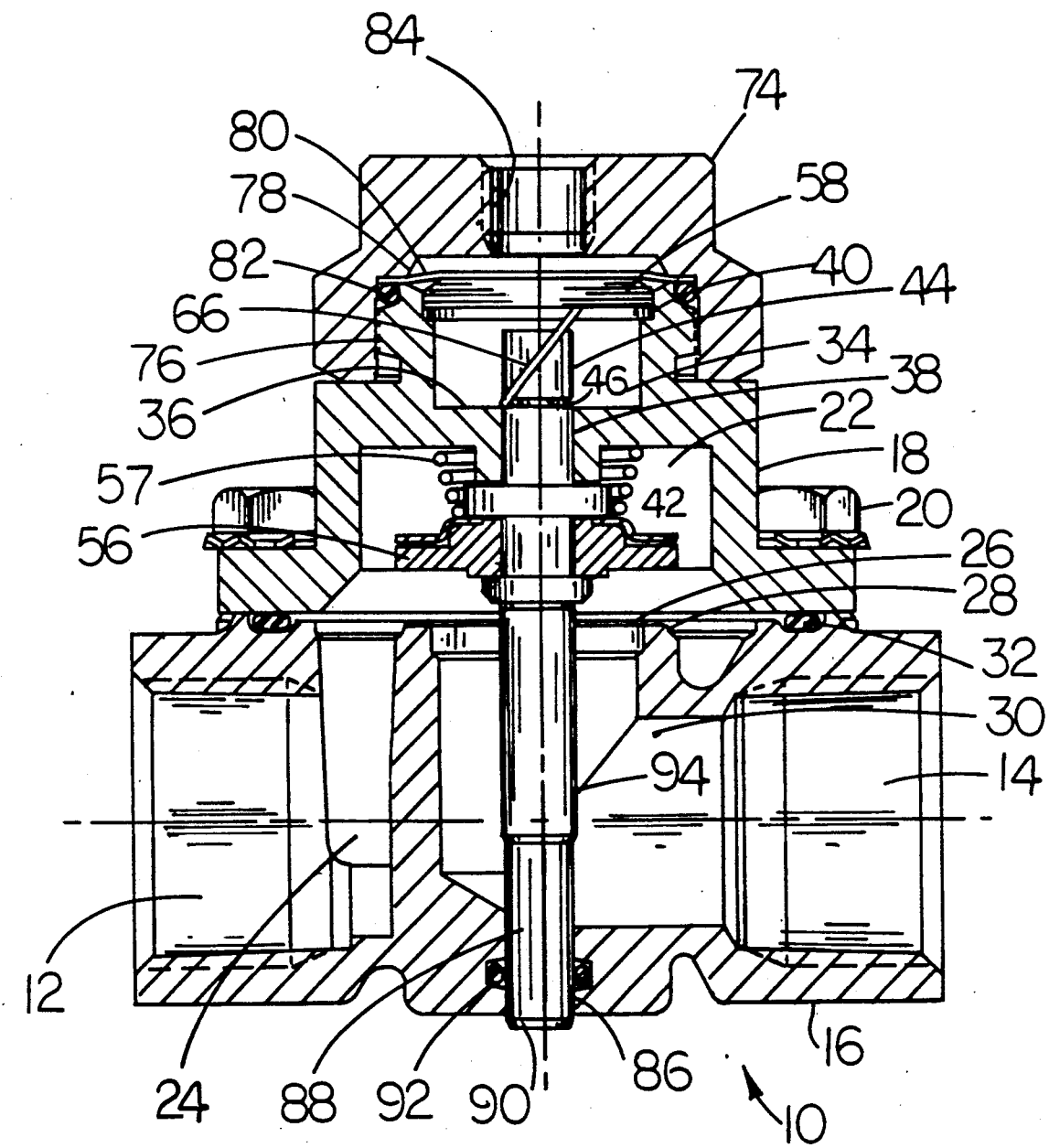
FIG. 1 is a partially cross sectioned view of the preferred embodiment of the shut off valve of the present invention.

Referring now to the drawings and particularly to FIG. 1, there is shown therein the preferred embodiment of the shut off valve of the present invention. The valve has a body, generally indicated 10. The body includes an inlet 12 and an outlet 14. The inlet and outlet are threaded as shown in the drawing to facilitate connection of the valve to fluid lines such as pipes that carry natural gas to an oven or furnace.

Body 10 is comprised of a first body portion 16 which includes the inlet and outlet. A second body portion 18 is attached to first body portion by bolts 20, only two of which are shown in FIG. 1. Second body portion 18 includes a cavity 22 therein.

Inlet 12 is in fluid connection with a first fluid conduit 24 which in the first body portion. First fluid conduit 24 extends upward from the inlet as shown in FIG. 1 and is in fluid communication with cavity 22 in the second body portion.

First body portion 16 also includes a circular opening 26 which is bounded by a raised seat 28. Opening 26 is in fluid communication with cavity 22. Opening 26 is also in fluid connection with outlet 14 through a second fluid conduit 30 in the first body portion. The first and second fluid conduits and the cavity comprise a first fluid passage means through the valve. A gasket 32 is positioned between the first and second body portions of the valve to keep the first fluid passage means fluid tight.

Second body portion 18 also includes a first chamber 34. First chamber 34 is a cylindrical chamber bounded at its lower side as shown in FIG. 1 by a first surface 36. A first bore 38 extends between the first chamber and the cavity. The first chamber 34 also has an enlarged cylindrical portion 40 at its upper end.

Figure 2:
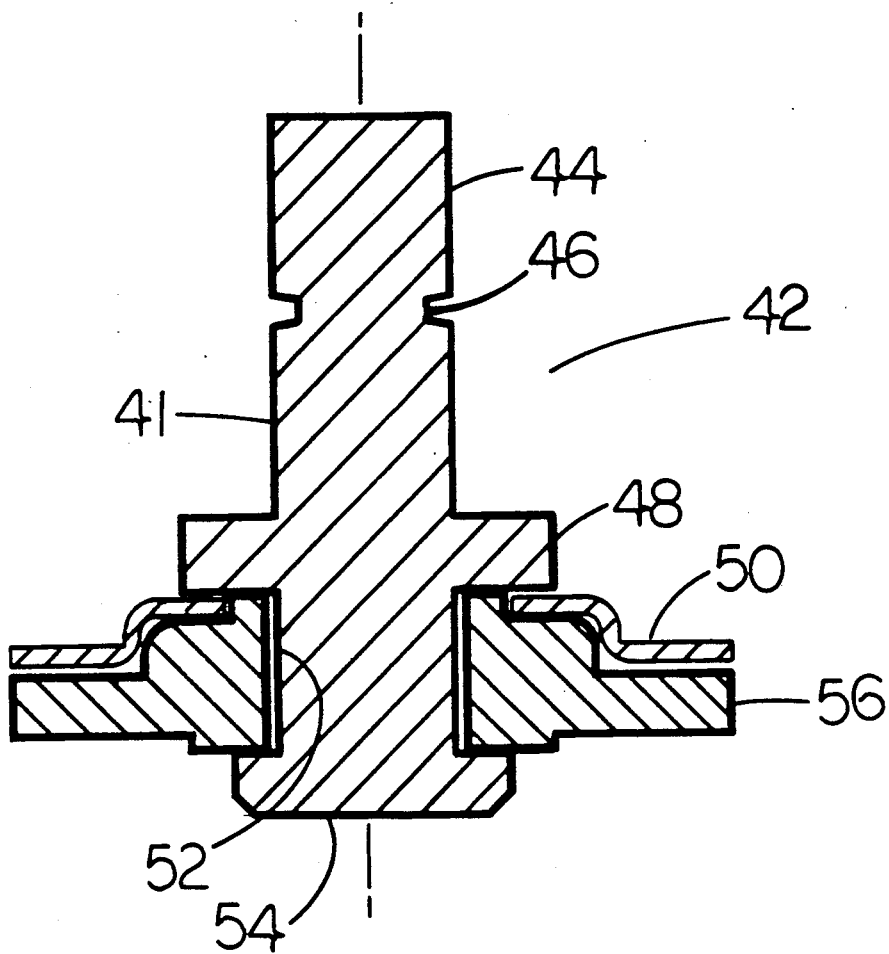
FIG. 2 is a cross sectional view of the plunger assembly of the shut off valve.

A plunger assembly 42 is mounted for longitudinal movement in first bore 38. As shown in FIG. 2, plunger assembly 42 includes a stem 41 which has a cylindrical upper portion 44. Cylindrical upper portion 44 includes a circumferential groove or recess 46. Plunger assembly 42 also has an enlarged flange portion 48. A circular backing plate 50 is mounted on stem 41 and abuts flange portion 48 of the stem. The stem also includes a narrowed portion 52 and a head 54.

Plunger assembly 42 also includes a circular seal disc 56. Seal disc 56 is made of resilient material and is sized for blocking opening 26 in the first body portion. In the preferred form of the invention the seal disc 56 is made of Buna-N rubber, but in other embodiments may be made of other materials suitable for use with the fluid which flows through the valve.

A compression spring 57 is positioned in cavity 22. Compression spring 57 biases plunger assembly 42 towards the second position.

Figure 3:
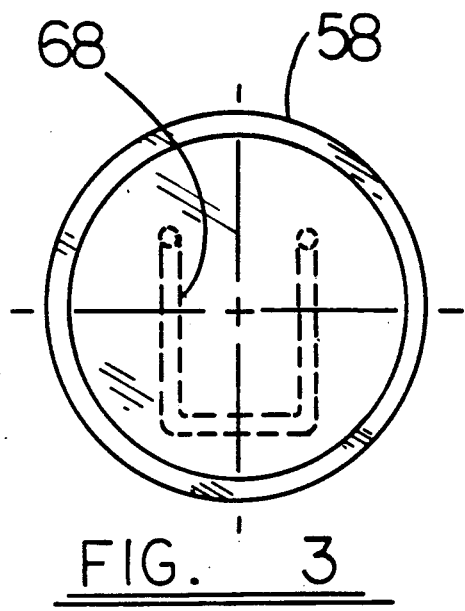
FIG. 3 is a top view of the pressure plate and wire spring of the valve.
Figure 4:
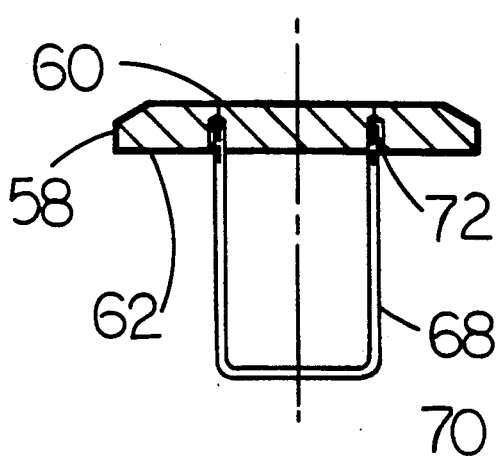
FIG. 4 is a side sectional view of the pressure plate and the wire spring of the valve taken along line A—A in FIG. 3.
Figure 5:
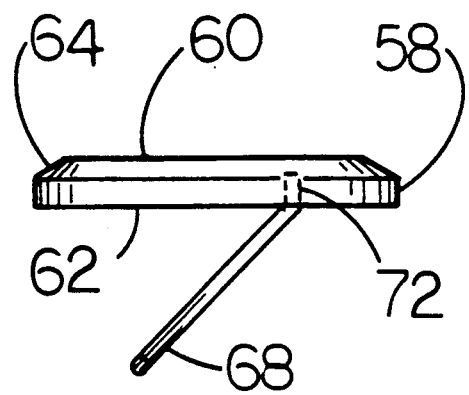
FIG. 5 is a front view of the pressure plate and wire spring of the valve.

A pressure plate 58 is mounted for movement in the enlarged cylindrical portion 40 of first chamber 44. As shown in FIGS. 3-5, pressure plate 58 has a flat top 60, bottom 62 and a beveled edge 64 adjacent to its top. A pair of spaced holes (not separately shown) extend into the bottom surface of pressure plate 58.

A generally u-shaped wire spring 66 serves as a latching member. Wire spring 66 includes a pair or legs 68 which are initially straight, but which are bent when the valve is first assembled to extend downward at an acute angle to first surface 36 of first chamber 34. A foot portion 70 of the wire spring 66 extends between the legs 68. Foot portion 70 abuts surface 36 and further engages recess 46 in the stem of the plunger assembly when the plunger assembly is in the first position as shown in FIG. 1. Wire spring 66 also includes a pair of nubs 72 which are accepted into the spaced holes of pressure plate 58. Pressure plate 58 serves as a supporting member for the wire spring to hold it in proper orientation.

Body 10 also includes a third body portion 74. Third body portion 74 is held to the second body portion by threads 76. A second chamber 78 is bounded by a third body portion 74 and is adjacent to first chamber 34. A diaphragm 80 separates the first chamber from the second chamber. An o-ring 82 helps to prevent external leakage from third chamber 78.

A control port 84 in the third body portion is in fluid communication through the body with second chamber 78. Control port 84 is threaded as shown to facilitate attachment to a source of fluid pressure through a conventional pipe or tube.

First body portion 16 includes a second bore 86 coaxial with plunger assembly 42. A movable pushrod 88 extends through the second bore. The pushrod is sufficiently long to have an inner end in contact with plunger assembly 42 while an outer end 90 of the pushrod extends through the bore to the outside of the valve body. An o-ring 92 is positioned in second bore 86 to prevent the escape of the fluid flowing through the valve around the pushrod. The o-ring also serves to provide a slight force on the pushrod. This holds it in position against the force of its own weight while still allowing it to be generally freely movable. Pushrod 88 also include an enlarged portion 94 which prevents the pushrod from falling out of the valve through the second bore.

In operation of the valve, the control port 84 of the valve is in fluid communication with a line which carries a fire extinguishing agent from its source to an application nozzle. As a result, the second chamber is maintained at the same pressure as the lines to the nozzles of the fire extinguishing system. When the plunger assembly 42 of the valve is in the first position shown in FIG. 1, natural gas or other combustible material flows through the valve from inlet 12 through the first fluid passage means comprised of first fluid conduit 24, cavity 22 and second fluid conduit 30, and leaves the valve through outlet 14. Plunger assembly 42 is held in the first position by engagement of foot portion 70 of wire spring 66 in recess 46 in the stem of the plunger.

When the fire extinguishing system is triggered, the flow of extinguishing agent increases the pressure in the lines that lead to the nozzles. The pressure in second chamber 78, which is connected to the lines through control port 84, similarly increases. The increased pressure pushes diaphragm 80 downward. The abutting pressure plate 58 is also moved downward in the first chamber 34.

The wire spring is deformed by the downward movement of the pressure plate 58. The foot portion 70 of the spring pushes against first surface 36 which deforms leg portions 68 of the spring. As wire spring 66 deforms, foot portion 70 moves to the left in FIG. 1 until it is outside of recess 46.

As wire spring 66 disengages from recess 46, the plunger assembly moves downward under the biasing force of compression spring 57. The plunger assembly moves downward until seal disc 56 contacts seat 28. The seal disc blocks opening 26 cutting off flow through the valve. As will be apparent to those skilled in the art, because cavity 22 is open to inlet 12, the fluid pressure of the supply tends to push the seal disc against the seat which helps to hold the valve closed.

Movement of the plunger assembly 42 to the second position moves pushrod 90 downward. The downward movement of the pushrod causes its outer end 90 to extend outside the valve body.

When the emergency has passed and the fire extinguishing system has returned to normal, the pressure in second chamber 78 falls to its original level. Flow may then be restored through the valve by manually pushing the outer end 90 of the pushrod into the body of the valve. Pushrod 88 engages the head 54 of the plunger assembly and moves it upward as shown in FIG. 1. Once the plunger assembly is again in the first position, the foot portion 70 of the wire spring 66 engages recess 46 in the stem of the plunger assembly. The valve is then ready to close again if the fire extinguishing system is triggered.

It should be mentioned that the valve construction of the present invention which provides for movement of the plunger assembly, includes a novel actuator which may be used in other types of fluid shut off valves and switches. The actuator portion of the valve may be used in many other types of valve and switch configurations that require longitudinal movement of a member to trigger the valve or switch.

Thus, the new shut off valve of the present invention achieves the above stated objectives, eliminates difficulties encountered in the use of the prior devices, solves problems and attains the desirable results described herein.

In the foregoing description certain terms have been used for brevity, clarity and understanding however no unnecessary limitations are to be implied therefrom because such terms are used for descriptive purposes and are intended to be broadly construed. Moreover, the descriptions and illustrations given are by way of examples and the invention is not limited to the exact details shown or described.

Having described the features, discoveries and principles of the invention, the manner in which it is utilized and the advantages and useful results obtained, the new and useful structures, devices, elements, arrangements, parts, combinations, systems, equipment, operations, methods and relationships are set forth in the appended claims.

We claim:

1. A shut off valve for shutting off fluid flow therethrough, comprising:
    a body, said body including a fluid inlet, a fluid outlet and fluid passage means for conducting fluid from said inlet to said outlet, said body further including a first chamber, said first chamber being bounded by a first surface at one end thereof;
    a latching member disposed in said first chamber, said latching member comprised of bendable material, said latching member including: at least one leg portion extending at an acute angle relative to said first surface; a foot portion engageable with said first surface; and a moveable member engaging portion;
    blocking means for selectively blocking said fluid passage means;
    moveable member means mounted for movement within said body and movable between a first position and a second position, said movable member means in operative connection with said blocking means to block said fluid passage means when said moveable member means is in the second position, said moveable member means further including engaging means in said first chamber for engaging said moveable member engaging portion of said latching member when said moveable member means is in the first position;
    biasing means for biasing said moveable member toward said second position;
    movement means bounding said first chamber at the other end thereof, said movement means moving said latching member towards said first surface, whereby said foot portion of said latching member engages said first surface of said chamber to bend said latching member, said moveable member engaging portion of said latching member disengages from said engagement means of said moveable member means, and the moveable member means moves to the second position shutting off flow through said valve.

2. The valve according to claim 1 and further comprising reset means for moving said movable member to said first position to engage said latching member, whereby flow through said valve is restored.

3. The valve according to claim 2 wherein said movement means includes pushing means operative to push said foot portion of said latching member against said first surface to bend said latching member, whereby said movable member engaging portion of said latching member disengages said engaging means of said movable member.

4. The valve according to claim 3 wherein said movable member is longitudinally movable along said axis; and
    said surface of said body extends generally normal of said axis and is adjacent said engaging means of said movable member when said movable member is in the first position.

5. The valve according to claim 4 wherein said engagement means of said movable member is a recess therein and said foot portion of said latching member engages said recess when said movable member is in the first position.

6. The valve according to claim 5 wherein said latching member is comprised of a generally u-shaped wire spring having a pair of leg portions and a foot portion, said foot portion extending generally perpendicular between said leg portions.

7. The valve according to claim 6 wherein said pushing means includes a pressure plate mounted for movement in a direction parallel of said axis in said first chamber, said wire spring fixably mounted to said pressure plate.

8. The valve according to claim 7 wherein said legs of said wire spring are accepted into holes in said pressure plate, whereby said wire spring is attached thereto.

9. The valve according to claim 8 wherein said body further comprises:

a second chamber adjacent said first chamber, said second chamber including a control port for introducing a control fluid thereto;

and said valve further comprises:

a diaphragm separating said first and second chambers, said pressure plate abutting said diaphragm;

whereby when said control fluid is applied to said control port said wire spring disengages from said movable member thereby enabling closing of said valve.

10. The valve according to claim 9 wherein said body includes a first bore coaxial of said axis, and said movable member comprises a generally cylindrical member movable in said first bore along said axis.

11. The valve according to claim 10 wherein said body further comprises an opening between said first and second chambers, and said blocking means comprises seal means mounted on said plunger, said seal means closing said opening in the second position.

12. The valve according to claim 11 wherein said opening is generally coaxial of said first bore and said seal is a generally circular seal mounted on said plunger.

13. The valve according to claim 12 and further comprising reset means for moving said movable member to said first position to engage said wire spring and thereby latch said moveable member in said first position.

14. The valve according to claim 13 wherein said valve body further comprises a second bore coaxial with said first bore, said second bore open to an exterior portion of said body, and said reset means comprises a reset member mounted for movement in said second bore, said reset member manually movable to engage and move said movable member from the second position to the first position.

15. The valve according to claim 14 wherein said reset member is a pushrod.

16. A valve actuator for moving fluid flow blocking means for blocking the flow of fluid through a shut off valve comprising:

a housing said housing including a first chamber and a second chamber, said housing further including a bore, said bore having an axis, and said bore extending to an opening in said first chamber, said first chamber including a first surface adjacent said opening of said bore, and means for introducing control fluid to said second chamber;

a movable member mounted for movement in said bore along said axis, said movable member in operative connection with said fluid blocking means of said valve, said movable member movable between first and second positions, said movable member including engaging means, said engaging means extending into said first chamber when said movable member is in the first position;

a diaphragm separating said first and second chambers;

biasing means for biasing said movable member toward the second position;

a supporting member mounted for movement in a direction parallel of said axis in said first chamber, said supporting member in abutting relation of said diaphragm;

a latching member disposed in said first chamber and mounted on said supporting member, said latching member comprised of bendable material, said latching member including at least one leg portion extending at an acute angle relative to said first surface, a surface engaging portion for engaging said first surface and a movable member engaging portion for engaging said engaging means of said movable member, and wherein movement of said supporting member bends said latching member to disengage said movable member engaging portion from said moveable member engaging means, whereby introducing control fluid to said second chamber enables said movable member to move to the second position.

17. The actuator according to claim 16 wherein said latching member comprises a wire spring having a leg portion extending at an acute angle to said first surface and a foot portion engaging said first surface.

18. The actuator according to claim 17 wherein said engaging means of said movable member is a recess therein, and said foot portion of said wire spring engages said recess when said movable member is in the first position.

19. The actuator according to claim 18 wherein said wire spring is generally u-shaped and includes a pair of parallel legs, and the foot portion extends generally normal of and between said legs.

* * * * *